United States Patent
Legrand, III et al.

(10) Patent No.: US 10,222,279 B1
(45) Date of Patent: Mar. 5, 2019

(54) FORCE MEASUREMENT DEVICE

(71) Applicant: AMAZON TECHNOLOGIES, INC., Reno, NV (US)

(72) Inventors: Louis Leroi Legrand, III, Seattle, WA (US); Debanjan Mukherjee, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/309,804

(22) Filed: Jun. 19, 2014

(51) Int. Cl.
*G01L 1/04* (2006.01)
*G01L 1/14* (2006.01)
*G01L 19/00* (2006.01)
*G01L 1/22* (2006.01)

(52) U.S. Cl.
CPC .......... *G01L 1/142* (2013.01); *G01L 19/0092* (2013.01); *G01L 1/22* (2013.01)

(58) Field of Classification Search
CPC ....... G01L 1/142; G01L 19/0092; G01L 1/22; G01L 3/101; G01L 5/221; B62D 5/0409; B62D 6/10
USPC ...... 73/780, 862.337, 862.626, 760, 862.325
See application file for complete search history.

(56) References Cited

U.S. PATENT DOCUMENTS

| | | | |
|---|---|---|---|
| 5,526,208 A * | 6/1996 | Hatch | G11B 5/4846 360/245.8 |
| 7,225,980 B2 | 6/2007 | Ku et al. | |
| 7,381,152 B2 | 6/2008 | Couvillion, Jr. et al. | |
| 7,387,592 B2 | 6/2008 | Couvillion, Jr. et al. | |
| 7,588,516 B2 * | 9/2009 | Couvillion, Jr. | A61M 16/0465 482/51 |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 8,835,191 B2 * | 9/2014 | Bryant | B82Y 10/00 257/415 |
| 2005/0174260 A1 * | 8/2005 | Arneson | G06F 3/0234 341/34 |
| 2006/0055165 A1 * | 3/2006 | Negoro | A63C 17/01 280/841 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Max H Noori
(74) *Attorney, Agent, or Firm* — Lindauer Law, PLLC

(57) ABSTRACT

Described is a force sensor stack configured to measure incident force. Data from the force sensor stack may be used to determine a weight of an object, determine a force distribution of the object resting on the force sensor stack, and so forth. The force sensor stack may comprise a plurality of force sensor layers. Each of the force sensor layers may be responsive to a different range of applied forces. The combined force sensor stacks may thus provide a wide dynamic range. A pressure concentrator layer may be configured to direct the incident force to particular portions of the force sensor layers.

21 Claims, 12 Drawing Sheets

(56) References Cited

U.S. PATENT DOCUMENTS

| | | | |
|---|---|---|---|
| 2010/0139418 A1* | 6/2010 | Loeb | G01L 5/228 |
| | | | 73/862.046 |
| 2011/0011936 A1 | 1/2011 | Morandi et al. | |
| 2011/0043491 A1* | 2/2011 | Oh | G06F 3/0236 |
| | | | 345/177 |
| 2012/0284132 A1 | 11/2012 | Kim et al. | |
| 2013/0284806 A1 | 10/2013 | Margalit | |
| 2014/0085254 A1* | 3/2014 | Tenuta | G06F 3/0414 |
| | | | 345/174 |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011, Retrieved from Internet: <URL:http://www.researchgate.net/publication/221568350_How_to_nudge_in_Situ_designing_lambent_devices_to_deliver_salient_information_in_supermarkets>.

Pop, Christian, "Introduction to the BodyCom Technology", AN1391, DS01391A, Microchip Technology, Inc., May 2, 2011.

\* cited by examiner

FORCE MEASUREMENT DEVICE

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers and the like. In each instance, for an item to be moved from one location to another, it is picked from its current location and transitioned to a new location. It is often desirable to track the transition of inventory, the location of inventory, or both.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
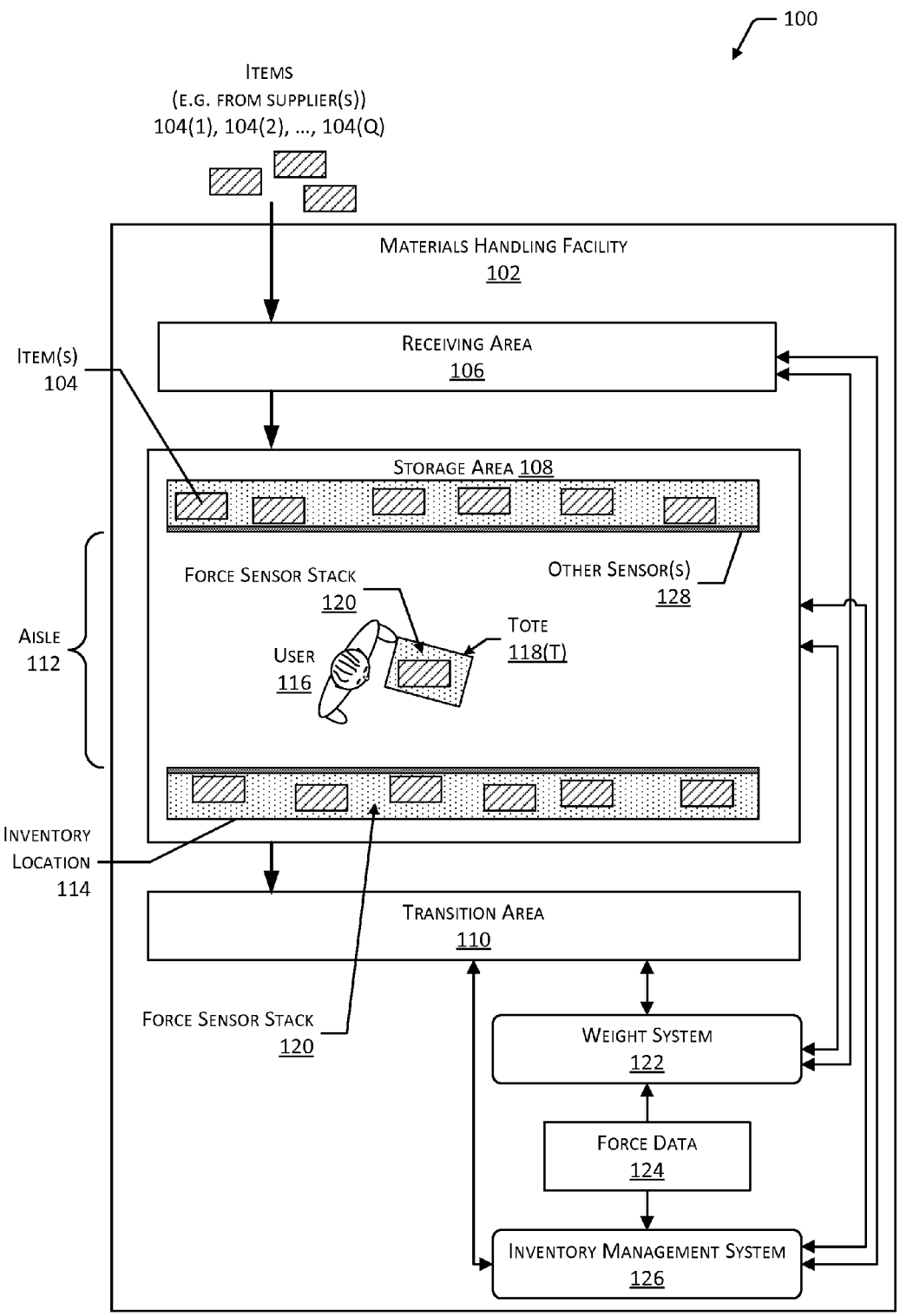
FIG. 1 is a block diagram illustrating a materials handling facility configured with force sensor stacks configured to generate force data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for determining information about a load using a force sensor stack. The load may include items such as goods which are stored and moved within a materials handling facility (facility). The force sensor stack may be configured to provide information indicative of pressure, applied force, weight, weight distribution, and so forth about the load. The force sensor stack may provide the information to an inventory management system. The information may be used with regard to inventory management, facility management, and so forth. For example, weight may be used to count a number of identical bulk objects or determine when the user is carrying something. In another example, force distribution data (such as an outline generated from such a force distribution) may confirm a particular item has been added to or removed from a location, assist in user identification, and so forth.

Traditional force sensors may exhibit sensitivity to a specified range of forces, such that greater applied forces corresponding to increased weight may result in sensor saturation and or inability to determine the applied force which is over a threshold value. The traditional force sensors may thus be considered to have a relatively limited dynamic range. Applied forces which are below the specified range may be undetected, while forces above the specified range may be incorrectly characterized. Furthermore, calibration of traditional force sensors having a plurality of sensing elements, such as in a mat, may be problematic.

Described in this disclosure are force sensor stacks. These stacks comprise a plurality of force sensor layers, and may also include a pressure concentrator layer. Each of the force sensor layers in the stack may be responsive to a different range of applied forces. These different ranges of applied force may be mutually exclusive, or may overlap at least in part. For example, the overlapping ranges may include a first force range which is indicative of pressures extending from 0.01 pound per square inch (PSI) to 1 PSI, a second force range which extends from 0.5 PSI to 50 PSI, and a third force range which extends from 25 PSI to 2500 PSI. By combining these force sensor layers, information such as applied force, force distribution, total weight, weight distribution, and so forth may be acquired for loads ranging from light to heavy. For example, the same force sensor stack may be used to measure the weight of a user and a tote or a single bolt.

The pressure concentrator layer may be arranged atop the force sensor layers and comprises a plurality of pressure concentrator features. For example, the pressure concentrator features may comprise pillars which come into contact with the force sensor layers, such as at (or between) the sensing elements (sensels). As a force is applied on the force sensor stack, the pressure concentrator features direct or otherwise communicate that force to the force sensor layers and the sensels therein. As a result, the force distribution is resolved to individual points, which may simplify calibration.

The force sensor stacks may be arranged at various positions at the facility. For example, the force sensor stacks may be placed on the floor to enable acquisition of data about users, totes, inventory locations, and so forth which rest thereon. Likewise, force sensor stacks may be used on the totes, inventory locations such as shelves or bins, and so forth. The inventory management module may use this information to track movement of objects within the facility such as users, items, totes, equipment, and so forth. For example, the inventory management module may detect a decrease in weight of 450 grams at a force sensor stack on an inventory location shelf, and detect an increase in weight of 450 grams at a tote. Based on this information, the inventory management module may determine that an item has been transferred from the inventory location to the tote. In some implementations, the inventory management system may use the total weight of an object, force distribution or weight distribution, location of the force change, position of applied force, and so forth to identify the object.

The facility may include a materials handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein allow for more accurate determinations of the weight, weight distribution, and so forth of a load as measured by one or more force sensor stacks. By analyzing the output from the force sensor stacks, the load may be identified, tracked, and so forth by the inventory management system.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one position within the facility 102 to another. Continuing the example, the inventory location 114 may move from one aisle 112 to another, from one position within an aisle 112 to another, and so forth.

One or more users 116(1), 116(2), . . . , 116(U) and totes 118(1), 118(2), 118, . . . , 118(T) or other material handling apparatus may move within the facility 102. For example, the user 116 may move about within the facility 102 to pick or place the items 104 in various inventory locations 114, placing them on the tote 118 for ease of transport.

Instead of or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move to a second inventory location 114(2).

One or more force sensor stacks 120 may be arranged within the facility 102 and configured to acquire information about a load thereon. The force sensor stacks 120 may operate as transducers which generate one or more signals based on an applied force, such as that of the load due to gravity. The load includes items 104, inventory locations 114 (such as a shelf or rack), users 116, totes 118, and so forth. The force sensor stacks 120 may be arranged on a floor of the facility 102, on inventory locations 114 such as upon shelves, within item stowage areas of totes 118, and so forth. The force sensor stacks 120 are configured to generate data indicative of applied force on the force sensor stacks 120. The force sensor stacks 120 may also indicate a two-dimensional position on the force sensor stack 120 of points on the force sensor stack 120 at which the applied force is present. The force sensor stacks 120 are discussed in more detail below with regard to FIGS. 5-12.

The force sensor stacks 120 may be coupled to a weight system 122 configured to generate force data 124. The force data 124 may include information indicative of one or more of weight of an object, force distribution of the object, change of weight over time, change of weight distribution over time, and so forth. For example, the force data 124 may indicate data indicative of a two-dimensional position and a magnitude of an applied force. Continuing the example, the force data 124 may comprise a footprint indicative of a shape of a shoe of the user 116.

The facility 102 may include, or be coupled to, an inventory management system 126. The inventory management system 126 is configured to interact with users 116 or devices such as force sensor stacks 120, other sensors 128, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item, depending on the nature of the enterprise that operates the facility 102.

Upon being received from a supplier at receiving area 106, the items 104 may be prepared for storage. For example, in some implementations, items 104 may be unpacked or otherwise rearranged. The inventory management system 126 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

One or more other sensors 128 may be configured to acquire information in the facility 102. This information may be used by the inventory management system 126. The other sensors 128 may include, but are not limited to, microphones, imaging sensors, temperature sensors, radio frequency (RF) receivers, humidity sensors, vibration sensors, and so forth. In one example, the inventory locations 114 may contain imaging sensors configured to acquire images of pick or placement of items 104 on shelves. The other sensors 128 are discussed in more detail below with regard to FIG. 2.

During operation of the facility 102, the sensors such as the force sensor stack 120 and the other sensors 128 may be configured to provide information suitable for tracking how objects move within the facility 102. For example, a decrease in weight at a particular inventory location 114 and a corresponding increase in weight of the tote 118 may indicate removal of an item 104 from the particular inventory location 114 by the user 116 and placement of the item 104 within the tote 118. The tote 118 is discussed in more detail below with regard to FIG. 4.

While the storage area 108 is depicted as having one or more aisles 112, inventory locations 114 storing the items 104, other sensors 128, and so forth, it is understood that the receiving area 106, the transition area 110, or other areas of the facility 102 may be similarly equipped. Furthermore, the arrangement of the various areas within the facility 102 are depicted functionally rather than schematically. For example, in some implementations multiple different receiving areas 106, storage areas 108, and transition areas 110 may be interspersed rather than segregated.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 126.

In another example, if the items 104 are departing the facility 102 a list of the items 104 may be obtained and used by the inventory management system 126 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The user 116 may benefit from various actions taken by the inventory management system 126 responsive to the force data 124. For example, as the weight of the tote 118 increases by particular weight amounts corresponding to previously stored weights of items 104, those items 104 on a pick list may be designated as "picked" based at least in part on the change in weight. In another example, the force data 124 from a force sensor stack 120 in the tote 118 may be used to determine a quantity of items 104 picked, and may be used to provide information indicative of an incorrect pick quantity. As a result, the experience of the user 116 in the facility 102 may be improved, efficiency of the facility's 102 operation may be improved, or other benefits may accrue.

Figure 2:
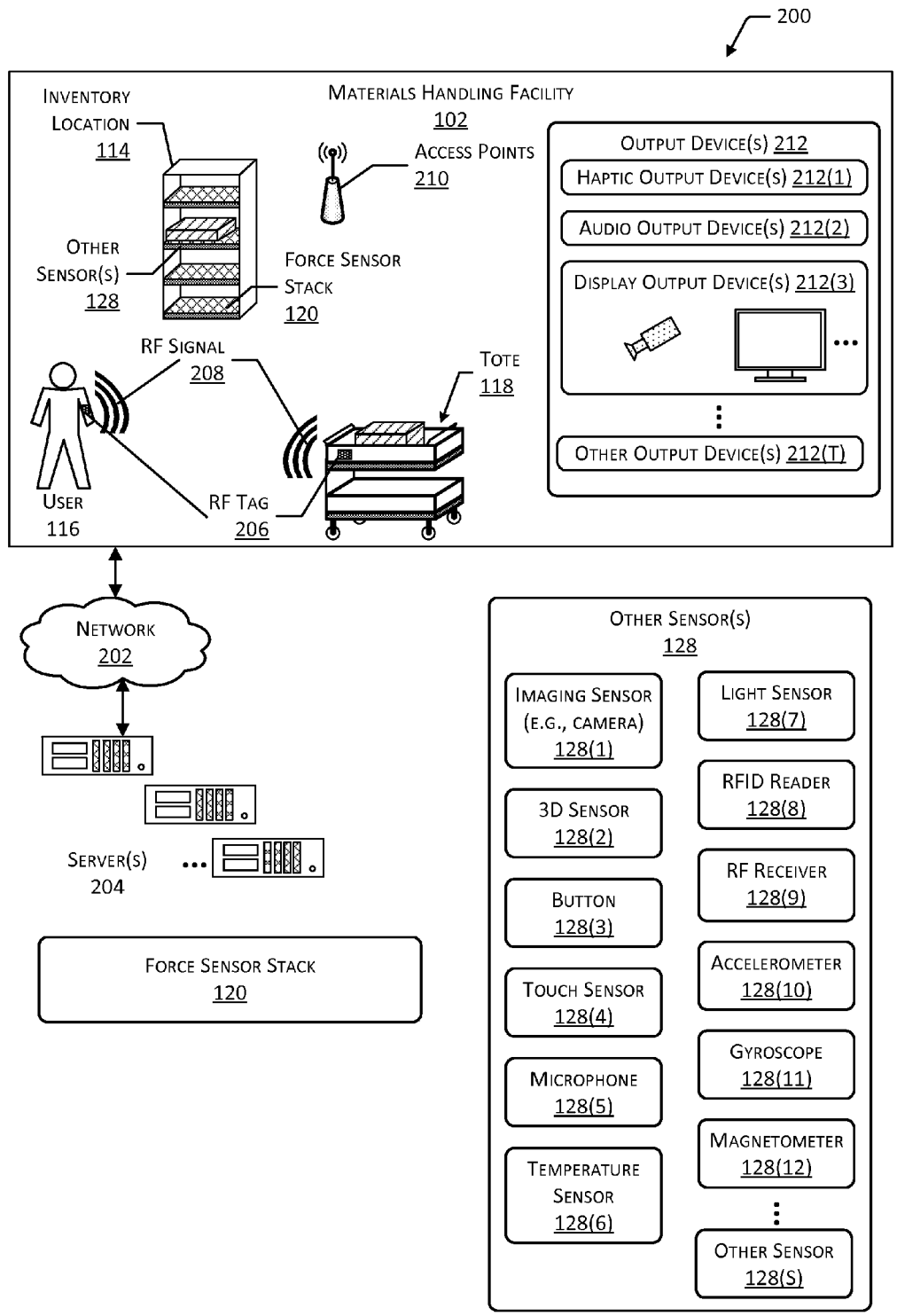
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite), or other connection technologies.

The servers 204 may be configured to execute one or more modules or software applications associated with the inventory management system 126. While the servers 204 are illustrated as being in a location outside of the facility 102, in other implementations at least a portion of the servers 204 may be located at the facility 102. The servers 204 are discussed in more detail below with regard to FIG. 3.

The users 116, the totes 118, or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth® Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 126 may be configured to use the RF tags 206 for one or more of identification of the object, determining a position of the object, and so forth. For example, the users 116 may wear RF tags 206, the totes 118 may have RF tags 206 affixed, and so forth which may be read and, based at least in part on signal strength, used to determine identity and position. The tote 118 is configured to carry or otherwise transport one or more items 104. For example, the tote 118 may include a basket, a cart, a bag, and so forth. The tote 118 is discussed in more detail below with regard to FIG. 4.

Generally, the inventory management system 126 or other systems associated with the facility 102 may include any number and combination of input components, output components, and servers 204.

The one or more force sensor stacks 120 or other sensors 128 may be arranged at one or more locations within the facility 102. For example, the force sensor stacks 120 may be arranged on the floor of the facility 102, the inventory locations 114, the totes 118, and so forth. In another example, the other sensors 128 may be mounted on or within a floor, wall, or ceiling, at an inventory location 114, on the tote 118, may be carried or worn by the user 116, and so forth.

The other sensors 128 may include one or more imaging sensors 128(1). These imaging sensors 128(1) may include cameras configured to acquire images of a scene. The imaging sensors 128(1) are configured to detect light in one or more wavelengths including, but not limited to, terahertz, infrared, visible, ultraviolet, and so forth. The inventory management system 126 may use image data acquired by the imaging sensors 128(1) during operation of the facility 102. For example, the inventory management system 126 may identify items 104, users 116, totes 118, and so forth based at least in part on their appearance within the image data.

One or more 3D sensors 128(2) may also be included in the other sensors 128. The 3D sensors 128(2) are configured to acquire spatial or three-dimensional data, such as depth information, about objects within a sensor field-of-view. The 3D sensors 128(2) include range cameras, lidar systems, sonar systems, radar systems, structured light systems, stereo vision systems, optical interferometry systems, and so forth. The inventory management system 126 may use the three-dimensional data acquired to identify objects, determine a position of an object, and so forth.

One or more buttons 128(3) may be configured to accept input from the user 116. The buttons 128(3) may comprise mechanical, capacitive, optical, or other mechanisms. For example, the buttons 128(3) may comprise mechanical switches configured to accept an applied force from a touch of the user 116 to generate an input signal. The inventory management system 126 may use data from the buttons 128(3) to receive information from the user 116. For example, the tote 118 may be configured with a button 128(3) configured such that the button 128(3) may be activated by the user 116.

The other sensors 128 may include one or more touch sensors 128(4). The touch sensors 128(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The position of that change in electrical resistance within the material may indicate the position of the touch. The inventory management system 126 may use data from the touch sensors 128(4) to receive information from the user 116. For example, the touch sensor 128(4) may be integrated with the tote 118 to provide a touchscreen with which the user 116 may select from a menu one or more particular items 104 for picking.

One or more microphones 128(5) may be configured to acquire audio data indicative of sound present in the environment. The sound may include the user speech uttered by the user 116. In some implementations, arrays of microphones 128(5) may be used.

One or more temperature sensors 128(6) are configured to measure the temperature of objects, air, water, and so forth. For example, the temperature sensors 128(6) may comprise infrared detectors configured to remotely determine a temperature of an item 104 while stored at the inventory location 114. Continuing the example, the inventory management system 126 may use the data acquired by the temperature sensors 128(6) to determine the item 104 has been maintained within a particular temperature range.

The other sensors 128 may include one or more light sensors 128(7). The light sensors 128(7) may be configured to provide information associated with ambient lighting conditions such as a level of illumination. Information acquired by the light sensors 128(7) may be used by the inventory management system 126 to adjust a level, intensity, or configuration of an output device.

One more radio frequency identification (RFID) readers 128(8), near field communication (NFC) systems, and so forth may also be provided in the other sensors 128. For example, the RFID readers 128(8) may be configured to read the RF tags 206. Information acquired by the RFID reader 128(8) may be used by the inventory management system 126 to identify an object associated with the RF tag 206 such as the item 104, the user 116, the tote 118, and so forth.

One or more RF receivers 128(9) may also be provided. In some implementations, the RF receivers 128(9) may be part of transceiver assemblies. The RF receivers 128(9) may be configured to acquire RF signals 208 associated with Wi-Fi® Bluetooth®, ZigBee®, 3G, 4G, LTE, or other wireless data transmission technologies. The RF receivers 128(9) may provide information associated with data transmitted via radio frequencies, signal strength of RF signals 208, and so forth. For example, information from the RF receivers 128(9) may be used by the inventory management system 126 to determine a location of an RF source such as a user device, the RF tag 206, and so forth.

The other sensors 128 may include one or more accelerometers 128(10), which may be worn or carried by the user 116, mounted to the tote 118, and so forth. The accelerometers 128(10) may provide information such as the direction and magnitude of an imposed acceleration.

A gyroscope 128(11) may provide information indicative of rotation of an object affixed thereto. For example, the tote 118 or other objects may be equipped with a gyroscope 128(11) to provide data indicative of a change in orientation.

A magnetometer 128 (12) may be used to determine a heading by measuring ambient magnetic fields, such as the terrestrial magnetic field. The magnetometer 128(12) may be worn or carried by the user 116, mounted to the tote 118, the user device, and so forth. For example, the magnetometer 128(12) in the user device as worn by the user 116 may act as a compass and provide information indicative of which way the tote 118 oriented.

The other sensors 128 may also be used by the facility 102. For example, the other sensors 128(S) may include proximity sensors, ultrasonic rangefinders, barometric sensors, hygrometers, biometric input devices, and so forth.

The facility 102 may include one or more access points 210 configured to establish one or more wireless networks. The access points 210 may use Wi-Fi®, near field communication (NFC), Bluetooth®, or other technologies to establish wireless communications between a device and the network 202. The wireless networks allow the devices to communicate with one or more of the inventory management system 126, the other sensors 128, the user devices, the RF tag 206, a communication device of the tote 118, or other devices.

The output devices 212 may also be provided in the facility 102. The output devices 212 are configured to generate signals which may be perceived by the user 116.

Haptic output devices 212(1) are configured to provide a signal which results in a tactile sensation of the user 116. The haptic output devices 212(1) may use one or more mechanisms such as electrical stimulation or mechanical displacement to provide the signal. For example, the haptic output devices 212(1) may be configured to generate a modulated electrical signal which produces an apparent tactile sensation in one or more fingers of the user 116. In another example, the haptic output devices 212(1) may comprise piezoelectric or rotary motor devices configured to provide a vibration which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the sound. These mechanisms may include, but are not limited to: voice coils, piezoelectric elements, magnetorestrictive elements, or electrostatic elements, and so forth. For example, a piezoelectric buzzer or a speaker may be used to provide acoustic output.

The display output devices 212(3) may be configured to provide output which may be seen by the user 116, or detected by a light-sensitive detector such as an imaging sensor 128(1) or light sensor 128(7). The output may be monochrome or color. The display devices 212(3) may be emissive, reflective, or both. An emissive display output device 212(3) is configured to emit light during operation. For example, a light emitting diode (LED) is an emissive visual display output device 212(3). In comparison, a reflective display output device 212(3) relies on ambient light to present an image. For example, an electrophoretic display is a reflective display output device 212(3). Backlights or front lights may be used to illuminate the reflective visual display output device 212(3) to provide visibility of the information in conditions where the ambient light levels are low.

Other output devices 212(T) may also be present. For example, the other output devices 212(T) may include scent/odor dispensers, document printers, three-dimensional printers or fabrication equipment, and so forth.

The inventory management system 126 may generate user interface data which is then used by the output device 212 to present a user interface. The user interface may be configured to stimulate one or more senses of the user 116. For example, the user interface may comprise visual, audible, and haptic output.

Figure 3:
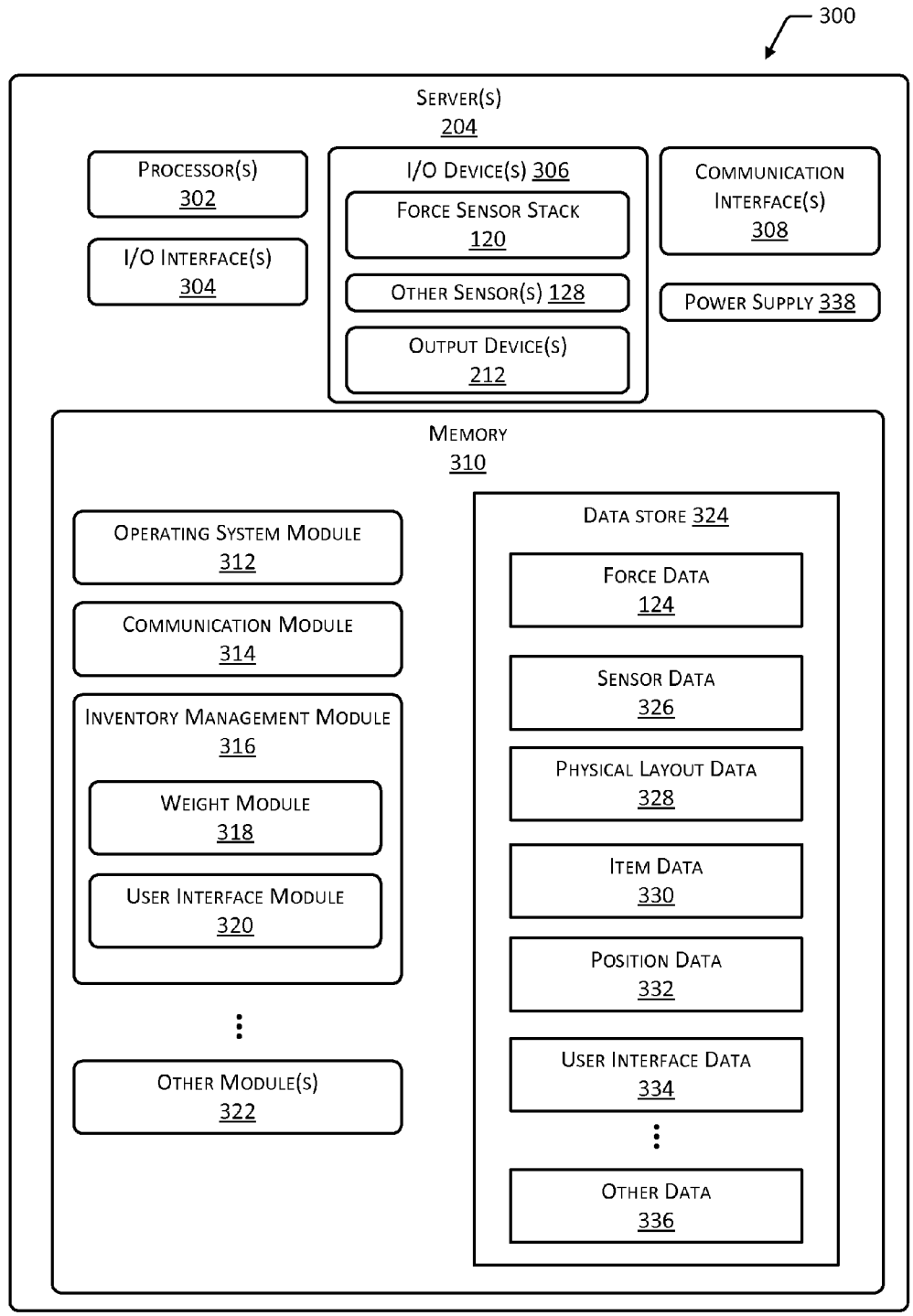
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers" and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise inter-integrated circuit (I2C), serial peripheral interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, the force sensor stacks 120, the other sensors 128, and so forth. The I/O devices 306 may also include output devices 212 such as one or more of a display, printer, audio speakers, and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the other sensors 128, the user devices, routers, the access points 210, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi®, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD® operating system as promulgated by the FreeBSD Project, other UNIX® or UNIX-like variants, a variation of the Linux® operating system as promulgated by Linus Torvalds, the Windows® Server operating system from Microsoft Corporation of Redmond, Wash., and so forth.

Also stored in the memory 310 may be one or more of the following modules. These modules may be executed as foreground applications, background tasks, daemons, and so forth.

A communication module 314 may be configured to establish communications with one or more of the other sensors 128, one or more of the user devices, other servers 204, or other devices. The communications may be authenticated, encrypted, and so forth.

The memory 310 may store an inventory management module 316. The inventory management module 316 is configured to provide the inventory functions as described herein with regard to the inventory management system 126. For example, the inventory management module 316 may track items 104 between different inventory locations 114, to and from the totes 118, and so forth.

The inventory management module 316 may include a weight module 318 and a user interface module 320. The weight module 318 is configured to provide the weight functions as described herein with regard to the weight system 122. The weight module 318 may be configured to process signals received from the force sensor stacks 120, or microcontrollers or electronic circuitry associated therewith. For example, the weight module 318 may process data received from the force sensor stacks 120 and generate a force distribution, total weight for an object, and so forth.

In some implementations, the weight module 318 may be configured to apply one or more data processing, or filtering techniques. For example, the weight module 318 may be configured to apply one or more decorrelation techniques to decorrelate data acquired by adjacent sensels. Adjacent sensels may occupy a common plane, may be located side-by-side to one another, and so forth. This decorrelation may improve the ability to distinguish edges in a force map, improve accuracy of a determined magnitude of the applied force, and so forth. Continuing the example, a whitening filter may be applied to the data received from the force sensor stacks 120.

The user interface module 320 may be configured to generate user interface data. The user interface data may be based at least in part on the force data 124 provided by the weight module 318. For example, the force data 124 may be used to generate user interface data which presents a weight of an object. The user interface data is configured to provide a user interface by way of one or more output devices 212. The user interface may include one or more of haptic, audible, or visual stimuli.

Other modules 322 may also be present in the memory 310. For example, an object recognition module may be configured to use weight distribution data of the force data 124 to identify an object such as the item 104, the user 116, the tote 118, and so forth.

The memory 310 may also include a data store 324 to store information. The data store 324 may use a flat file, database, linked list, tree, executable code, script, or other data structure to store the information. In some implementations, the data store 324 or a portion of the data store 324 may be distributed across one or more other devices including other servers 204, network attached storage devices and so forth.

The force data 124 may be stored in the data store 324. The force data 124 may include information as of a particular point in time, or over a period of time. For example, the force data 124 may include a time series indicating a change in weight, weight distribution, and so forth from a first time to a second time.

The data store 324 may also include sensor data 326 as acquired from the other sensors 128. The sensor data 326 comprises information acquired from, or based on, the one or more other sensors 128. For example, the sensor data 326 may comprise three-dimensional information about an object in the facility 102. As described above, the other sensors 128 may include an imaging sensor 128(1) which is configured to acquire one or more images. These images may be stored as image data 326(1). The image data 326(1) may comprise information descriptive of a plurality of picture elements or pixels.

Physical layout data 328 may also be stored within the data store 324. The physical layout data 328 provides a mapping of physical positions within the physical layout of devices and objects such as the force sensor stacks 120, other sensors 128, inventory locations 114, and so forth. For example, the physical layout data 328 may indicate the coordinates within the facility 102 of a force sensor stack 120 on the floor, and may include information associating a particular set of coordinates on the force sensor stack 120 with the particular position within the facility 102.

Item data 330 may also be included in the data store 324. The item data 330 comprises information associated with the items 104. The information may include one or more inventory locations 114 at which one or more of the items 104 are stored. The item data 330 may also include order data, SKU or other product identifier, price, quantity on hand, weight, expiration date, images of the item, detail description information, ratings, ranking, and so forth. The inventory management module 316 may store information associated with inventory management functions in the item data 330.

Position data 332 may be stored in the data store 324 which is indicative of a position in the facility 102 of an object such as an inventory location 114, a user 116, tote 118, and so forth. The position data 332 may be expressed in absolute terms or relative terms. Absolute terms may comprise a latitude, longitude, and altitude with respect to a geodetic reference point. Relative terms may include a position of 25.4 m along an x-axis and 75.2 m along a y-axis is designated by a floor plan of the facility 102, 5.2 m from an inventory location 114 along the heading of 169°, and so forth. In some implementations, the weight module 318 may be configured to generate position data 332. Based at least in part on the force data 124 acquired by the force sensor stack 120. For example, the force sensor stack 120 on the floor of the facility 102 may be configured to report a position of the user's feet.

The data store 324 may also store user interface data 334. The user interface data 334 may comprise commands, instructions, tags, markup language, images, color values, text, or other data. For example, the user interface data 334 may be expressed as hypertext markup language (HTML), cascading style sheets (CSS), JavaScript, and so forth. One or more output devices 212, user devices, or a combination thereof are configured to use the user interface data 334 to present the user interface which may be perceived by the user 116. The user interface may include one or more elements including visual, haptic, audible, olfactory, and so forth. For example, the user interface may be a graphical user interface, audible user interface, haptic user interface, or a combination thereof.

The data store 324 may also include other data 336. For example, the other data 336 may include information such as configuration files, user identification information, user demographic data, user weight, and so forth.

The server 204 may also include a power supply 338. The power supply 338 is configured to provide electrical power suitable for operating the components in the server 204.

Figure 4:
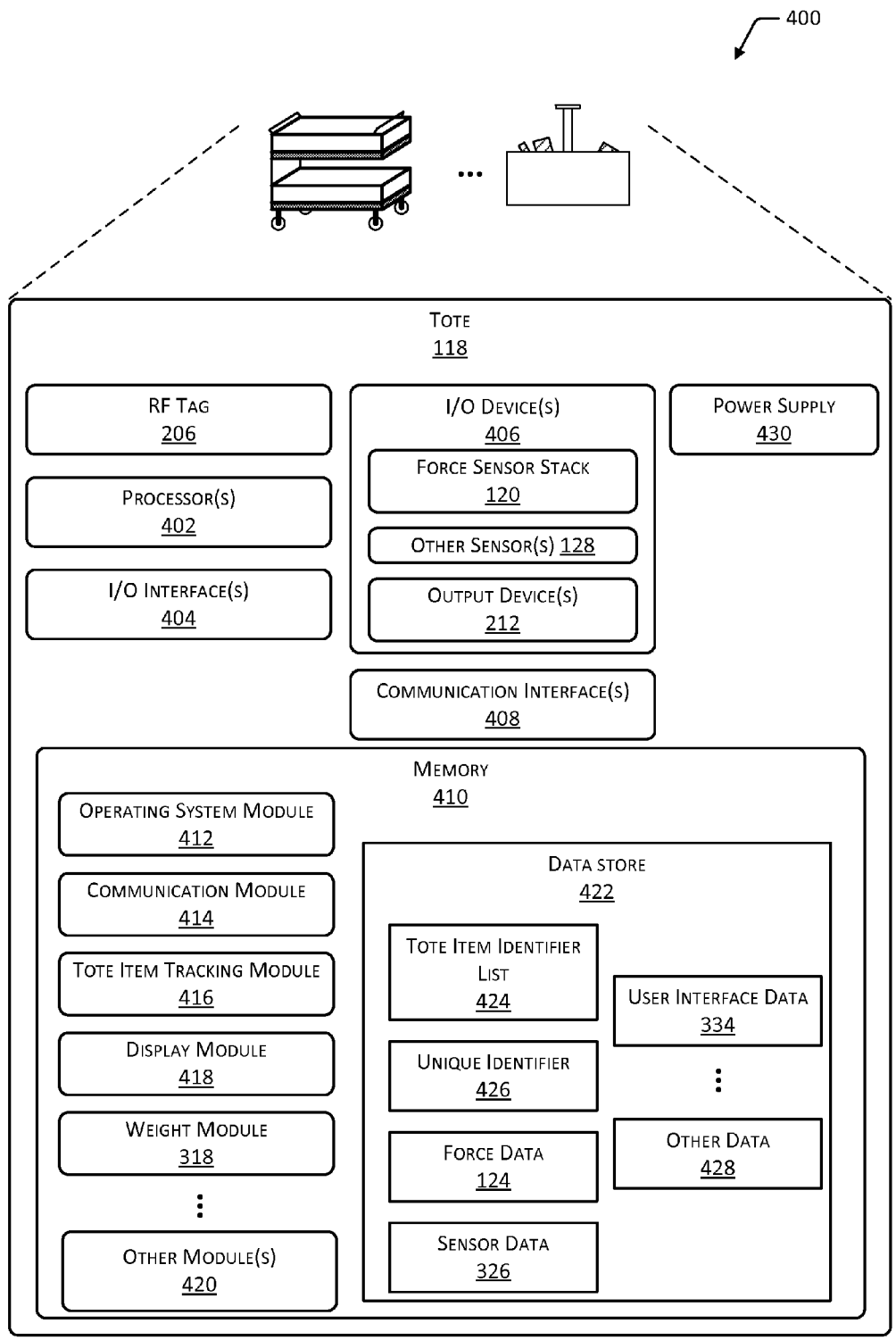
FIG. 4 is a block diagram of a tote, according to some implementations.

FIG. 4 illustrates a block diagram 400 of the tote 118, according to some implementations. The tote 118 may include an RF tag 206. The RF tag 206 may be affixed to, integral with, or is otherwise associated with the tote 118. In some implementations, the tote 118 may have identifiers, tags, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the force sensor stacks 120, the other sensors 128, and so forth. As described above, the other sensors 128 may include imaging sensors 128(1), RFID readers 128(8), and so forth. The I/O devices 406 may also include output devices 212 such as haptic output devices 212(1), audio output devices 212(2), display devices 212(3), and so forth. In some implementations, input and output devices may be combined. For example, a touchscreen display may incorporate a touch sensor 128(4) and a display device 212(3). In some embodiments, the I/O devices 406 may be physically incorporated with the tote 118 or may be externally placed.

The tote 118 may also include one or more communication interfaces 408. The communication interfaces 408 are configured to provide communications between the tote 118 and other devices, such as other totes 118, user devices, routers, access points, the servers 204, and so forth. The communication interfaces 408 may include devices configured to couple to PANs, LANs, WANs, and so forth. For example, the communication interfaces 408 may include devices compatible with Ethernet, Wi-Fi®, Bluetooth®, ZigBee®, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD® operating system as promulgated by the FreeBSD Project, other UNIX® or UNIX-like variants, a variation of the Linux® operating system, such as Android® as promulgated by Google, Inc. of Mountain View, Calif. Other OS modules 412 may be used, such as the Windows® operating system from Microsoft Corporation of Redmond, Wash., the LynxOS® from LynxWorks of San Jose, Calif., and so forth.

Also stored in the memory 410 may be one or more of the following modules. These modules may be executed as foreground applications, background tasks, daemons, and so forth.

A communication module 414 may be configured to establish communications with one or more of the other sensors 128, other totes 118, the user devices, the servers 204, or other devices. The communications may be authenticated, encrypted, and so forth.

The memory 410 may also store a tote item tracking module 416. The tote item tracking module 416 is configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the force sensor stack 120. The tote item tracking module 416 may send the list of items 104 to the inventory management system 126. The tote item tracking module 416 may also be configured to receive information from the inventory management system 126. For example, a list of items 104 to be picked may be presented within a user interface 132 on the display device 212(3) of the tote 118. Continuing the example, the list of items to be picked may include a weight of the items, and these weight values may be compared with the force data 124 generated from the force sensor stack 120 onboard the tote 118.

The memory 410 may include a display module 418. The display module 418 may be configured to present information, such as received from the one or more servers 204 or generated onboard the tote 118, using one or more of the output devices 212. For example, the display module 418 may be configured to receive user interface data 334 provided by the user interface module 320. By rendering or otherwise processing user interface data 334, the user interface may be presented to the user 116 by way of the output devices 212 of the tote 118.

In some implementations, the memory 410 may also store a weight module 318. The weight module 318 may execute locally on the tote 118 to process signals from the force sensor stack 120 onboard the tote 118 to generate force data 124.

Other modules 420 may also be stored within the memory 410. In one implementation, a data handler module may be configured to generate sensor data 326. For example, an imaging sensor 128(1) onboard the tote 118 may acquire image data 326(1) and one or more microphones 128(5) onboard the tote 118 may acquire audio data 326(2).

The other modules 420 may also include a user authentication module which may be configured to receive input and authenticate or identify a particular user 116. For example, the user 116 may enter a personal identification number or may provide a fingerprint to the fingerprint reader to establish their identity.

The memory 410 may also include a data store 422 to store information. The data store 422 may use a flat file, database, linked list, tree, executable code, script, or other data structure to store the information. In some implementations, the data store 422 or a portion of the data store 422 may be distributed across one or more other devices including the servers 204, other totes 118, network attached storage devices and so forth.

The data store 422 may store a tote item identifier list 424. The tote item identifier list 424 may comprise data indicating one or more items 104 associated with the tote 118. For example, the tote item identifier list 424 may indicate the items 104 which are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of a communication interface 408. For example, the unique identifier 426 may comprise a media access control address associated with a Bluetooth® interface. In some implementations, the user interface module 320 may use the unique identifier 426 to determine which tote 118 to generate the user interface upon, or to determine a source for the sensor data 326.

The data store 422 may also store force data 124 generated from a force sensor stack 120 onboard the tote 118. The data store 422 may also include sensor data 326. The sensor data 326 may be acquired from the other sensors 128 onboard the tote 118. The user interface data 334 received by the tote 118 may also be stored in the data store 422. Other data 428 may also be stored within the data store 422. For example, tote configuration settings, user interface preferences, and so forth may also be stored.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
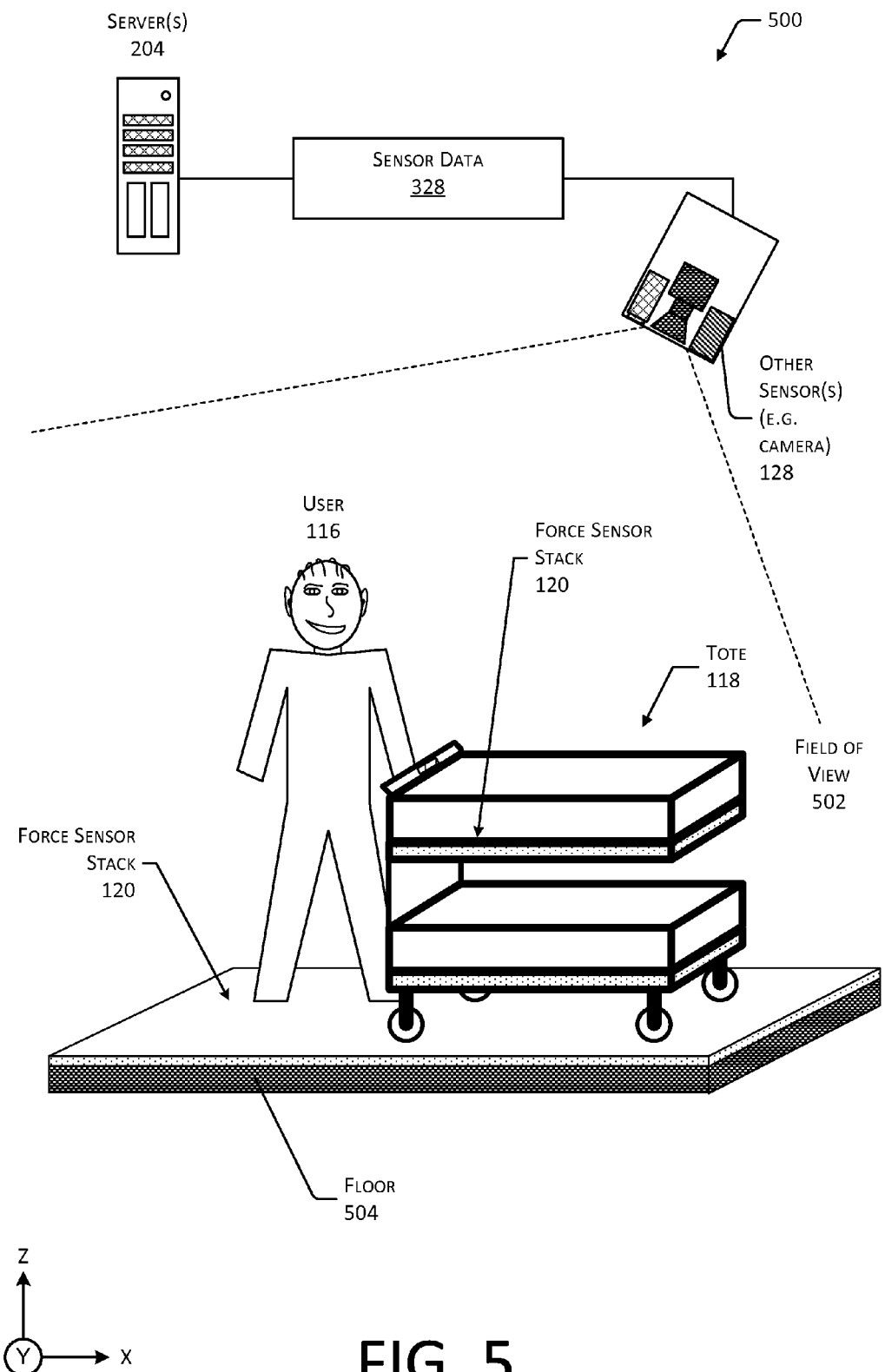
FIG. 5 illustrates an overhead imaging sensor and a force sensor stack on the floor configured to acquire sensor data in the facility, according to some implementations.

FIG. 5 illustrates a side view 500 of an overhead imaging sensor 128(1) acquiring an image of the users 116, the tote 118, and other objects and a force sensor stack 120 in the floor.

The facility 102 may include one or more of the other sensors 128 which are configured to acquire an image from an overhead vantage point or at other positions within the facility 102. The other sensors 128 may include, but are not limited to, one or more of the imaging sensors 128(1), the 3D sensors 128(2), the microphones 128(5), the RFID readers 128(8), the RF receivers 128(9), and so forth. The sensor data 326 acquired by the other sensors 128 may be used by the inventory management module 316.

In this illustration, one of the other sensors 128 comprises an imaging sensor 128(1) which is configured to generate image data 326(1). A field of view 502 of the imaging sensor 128(1) depicted here includes the user 116(1) and the tote 118. The image data 326(1) may be provided to the inventory management system 126. For example, the inventory management module 316 executing on the server 204 may process the image data 326(1) to identify the user 116.

A floor 504 of the facility 102 may comprise concrete, wood, plastic, tile, or other materials. The force sensor stack 120 may be placed atop the floor 504, and configured to generate force data 124 for loads resting thereon. The force sensor stack 120 arranged on the floor 504 may be installed in modular sections, such as tiles.

Illustrative Devices

The following figures are not necessarily to scale. Furthermore, the proportion between different components as illustrated may vary. For example, in the following figures the vertical scale may be exaggerated to facilitate illustration. Furthermore, the mutually orthogonal X, Y and Z axes are depicted to facilitate description, and not necessarily as a limitation.

Figure 6:
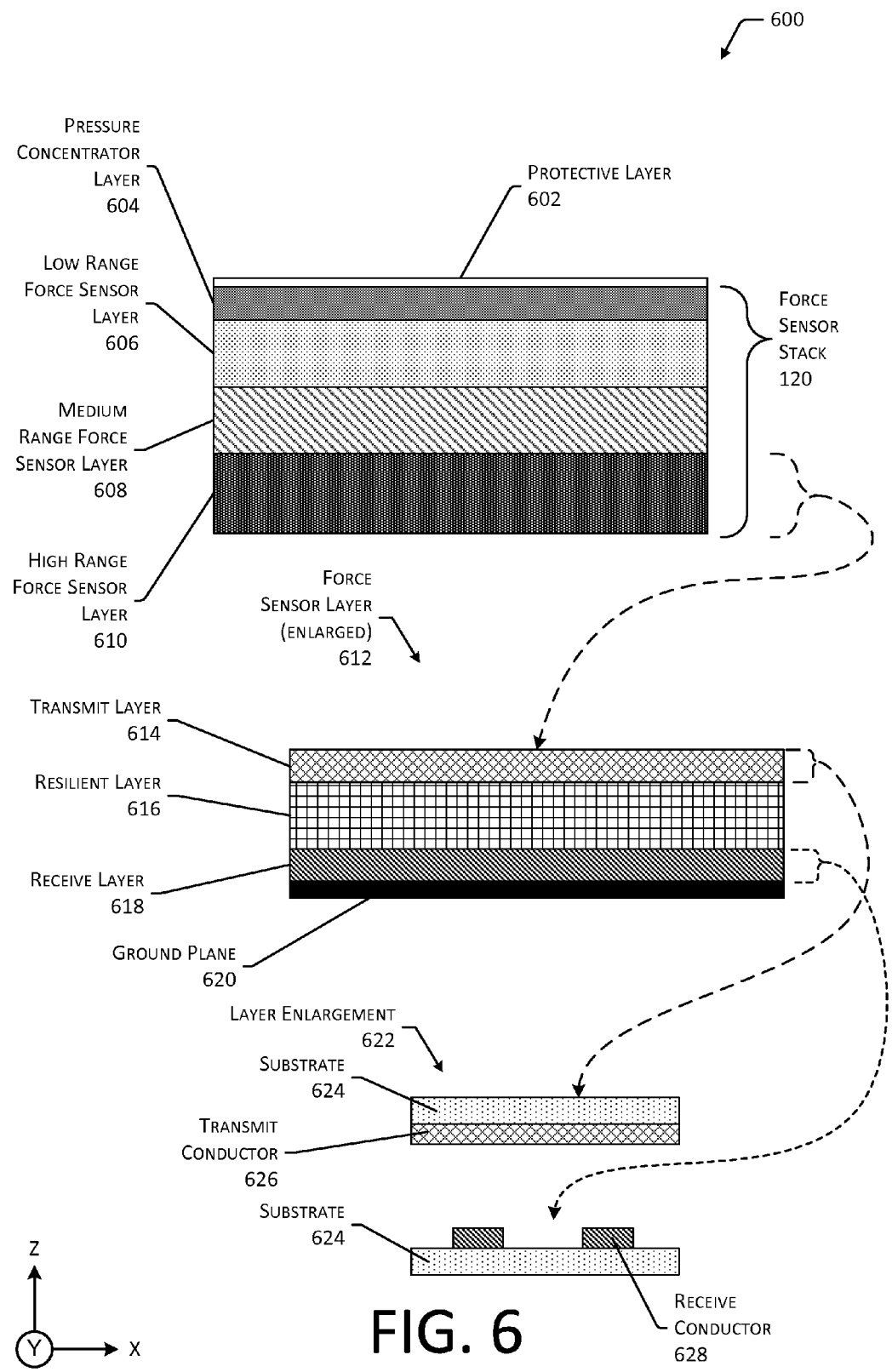
FIG. 6 is a side view of a force sensor stack, according to some implementations.

FIG. 6 is a side view 600 of the force sensor stack 120, according to some implementations. In the implementation depicted here, the force sensor stack 120 comprises a protective layer 602, a pressure concentrator layer 604, a low range force sensor layer 606, a medium range force sensor layer 608, and a high range force sensor layer 610.

The protective layer 602 comprises a flexible material, which may be configured to prevent contaminants such as dirt, moisture, and so forth from entering the force sensor stack 120. For example, the protective layer 602 may comprise polyethylene terephthalate (PET), silicone rubber, and so forth. The protective layer 602 may be arranged between an exterior of the force sensor stack 120 and an underlying pressure concentrator layer 604.

The pressure concentrator layer 604 comprises a plurality of pressure concentrator features which are configured to direct an incident force from an object (such as an item 104 resting thereupon, a user's 116 finger, and so forth) from one area to another on the underlying sensor layer, such as the low range force sensor layer 606. For example, a force applied to an area on the pressure concentrator layer 604 may be transferred to an area on the underlying sensor layer which is proximate to one or more of the sensels. The area of the force applied to the pressure concentrator layer 604 may be greater than an area of the force as transmitted to the underlying sensor layers. For example, force from a user fingertip covering 1 centimeter square over area on the pressure concentrator layer 604 may be transferred to a pressure concentrator feature having an area of 2 millimeters square on the underlying sensor layer.

The pressure concentrator layer 604 may comprise a rigid or semi-rigid material. For example, the pressure concentrator layer 604 may comprise a metal, ceramic, hard plastic, and so forth. In some implementations, the sensor layers 606 through 610 may be configured such that sensing elements (sensels) within each layer are aligned with sensels in adjacent layers. The pressure concentrator features may be configured to redirect an applied force on the pressure concentrator layer 604 to the locations of the sensels.

The pressure concentrator layer 604 may be arranged atop the force sensor stack 120 which would be proximate to the load. For example, the pressure concentrator layer 604 may be arranged between an exterior of the force sensor stack 120 and the force sensor layers. In another implementation, the pressure concentrator layer 604 may be arranged between the sensor layers. For example, the pressure concentrator layer 604 may be arranged between the low range force sensor layer 606 and the medium range force sensor layer 608. In other implementations, a plurality of pressure concentrator layers 604 may be incorporated within the force sensor stack 120. The pressure concentrator layer 604 is described in more detail below with regard to FIGS. 9-11.

The sensor layers 606 through 610 may use one or more techniques to determine force is being applied to the layer, magnitude of the force, a position of the force within a two-dimensional plane described by the layer, and so forth. These techniques may include capacitive sensing, resistive sensing, optical interference, acoustic changes, and so forth. An example of a sensor layer is described below in more detail.

The different sensor layers 606 through 610 are configured to be sensitive to different ranges of applied force. For example, the low range force sensor layer 606 may be sensitive to applied forces which produce pressures of 0.01 PSI to 1 PSI, while the medium range force sensor layer 608 is sensitive to applied forces producing pressures of 0.5 PSI to 25 PSI, and the high range force sensor layer 610 is sensitive to forces producing pressures of 25 PSI to 2500 PSI. By combining sensor layers responsive to different ranges of applied forces, the force sensor stack 120 is able to provide force data 124 across a very wide dynamic range. For example, a light load, such as a small item 104 may be detected by the low range force sensor layer 606 and corresponding force data 124 is generated. The medium range force sensor layer 608 and the high range force sensor layer 610 may not register the load. In another example, a very heavy load, such as a heavily laden tote 118 may saturate the low range force sensor layer 606 and the medium range force sensor layer 608, while the high range force sensor layer 610 provides information which may be used to generate the force data 124.

The ranges of forces to which the sensor layers are responsive may overlap one another, may be mutually exclusive, or may be discontinuous. For example, as described above, the force ranges of the low range force sensor layer 606 and the medium range force sensor layer 608 have a common interval of 0.5 PSI to 1 PSI, while the medium range force sensor layer 608 and the high range force sensor layer 610 have a common interval of 25 PSI to 50 PSI. However, in some implementations, there may be no overlap between the ranges, or there may be discontinuities or force ranges for which the force sensor stack 120 does not include a sensor layer which is responsive thereto.

At 612, an enlargement of a force sensor layer is depicted here. This enlargement is depicted of the high range force sensor layer 610, however, the other sensor layers 606 and 608 may be similarly configured. In this illustration, the high range force sensor layer 610 comprises a transmit layer 614, a resilient layer 616, a receive layer 618, and a ground plane 620.

The transmit layer 614, the receive layer 618, or both may comprise one or more electrical conductors. For example, the electrical conductors may comprise metals, conductive carbon compounds, conductive inks, and so forth. In some implementations, the transmit layer 614 may comprise a substrate onto which the electrical conductors have been affixed. For example, the electrical conductors may be laminated, printed, or otherwise deposited on the substrate to form the transmit layer 614. The receive layer 618 may comprise a similar structure. The electrical conductors on the transmit layer 614, the receive layer 618, or both may be arranged in a regular periodic pattern. For example, transmit layer 614 may comprise electrical conductors which are arranged in rows, while the receive layer 618 comprises electrical conductors which are arranged in columns.

The transmit layer 614 of the receive layer 618 are separated from one another by the resilient layer 616. The resilient layer 616 comprises a material which exhibits a spring back effect such that an applied force deforms the resilient layer 616, but upon removal of the applied force the resilient layer 616 is configured to return to substantially the same state as before the applied force. The resilient layer 616 may comprise a foam, and aerogel, silicone rubber, and so forth. The foam may comprise a polyethylene foam, a urethane foam, plastic foam, and so forth. For example, the resilient layer 616 as used in a sensor layer which relies on measurement of electrical capacitance to determine an applied force may comprise a urethane foam, such as Poron® 470-15-06021-90 as manufactured by Rogers Foam Corporation of Somerville, Mass. In some implementations, the resilient layer 616 may act as a dielectric or electrical insulator. In other implementations, such as where the sensor layer measures changes to electrical resistance, the resilient layer 616 may be configured to provide variable electrical conductance based on compression.

The degree of resilience of the material in the resilient layer 616 may be used to provide the different ranges of force sensitivity. For example, where the resilient layer 616 comprises a stiff foam the range of force sensitivity may be greater than that provided by the resilient layer 616 comprising a soft foam. In some implementations the degree of resilience may be specified in terms of indentation load deflection (ILD) or indentation force deflection (IFD). IFD and ILD may be specified as a measurement of how many Newtons of force are required to compress a particular area to a stated percentage of the material's uncompressed height. For example, urethane foams (or other materials) may be characterized using Test Method ASTM D3574 as promulgated by ASTM International, formerly the American Society for Testing and Materials.

A layer enlargement 622 depicts enlargements of the transmit layer 614 and the receive layer 618. Each of the layers may include a substrate 624. For example, the substrate 624 may comprise a film of PTE polymer. The transmit layer 614 may have one or more transmit conductors 626 arranged thereon. The transmit conductors 626 or electrodes may be laminated, printed, or otherwise deposited on the substrate 624 to form the transmit layer 614. Similarly, the receive layer 618 may comprise a substrate 624 upon which one or more receive conductors 628 or electrodes are arranged. The transmit conductors 626 and the receive conductors 628 may be configured to form a regular array, such as a matrix of rows and columns, respectively. In other implementations, other geometries may be employed. In some implementations, the relative arrangements of the transmit layer 614 and the receive layer 618 may be swapped, and likewise, the function of a conductor as a transmit conductor 626 or a receive conductor 628 may be adjusted such as by switching the conductor to be connected to an output or an input.

In some implementations, the transmit conductors 626, the received conductors 628, or both may be arranged directly upon the resilient layer 616. For example, the conductors may be laminated, printed, or otherwise deposited on the resilient layer 616. In these implementations, the resilient layer 616 may replace the substrate 624.

For example, a capacitive force sensor may comprise a transmit conductor 626 or electrode comprising an electrical conductor configured to emit an electrical charge. An electrical insulator or dielectric separates the transmit conductor 626 from the receive conductor 628. The receive electrode comprising an electrical conductor configured to receive the electrical charge. A capacitive detector determines electrical capacitance between the transmit electrode and the receive electrode. Based at least in part on the degree of capacitance, an applied force may be detected, and in some implementations a magnitude may be measured.

In another example, a resistive force sensor comprises a transmit conductor 626 or electrode comprising an electrical conductor configured to emit an electrical charge. A dielectric or electrical insulator separates the transmit conductor 626 and the receive conductor 628. The dielectric is configured to vary in electrical resistivity upon compression. For example, the dielectric may comprise an electrically conductive foam. An electrical resistance detector is configured to determine electrical resistance between the transmit conductor 626 and the receive conductor 628. Based at least in part on the degree of resistance, an applied force may be detected, and in some implementations a magnitude may be measured.

As described above, the proportions of the different elements depicted may vary. For example, different sensor layers may have different thicknesses. Continuing the example, the low range force sensor layer 606 may be 1 mm thick, while the high range force sensor layer 610 may be 3 mm thick.

The ground plane 620 may comprise a conductive film on a plastic substrate, a copper clad glass reinforced epoxy laminate sheet, and so forth. For example, the ground plane 620 may comprise aluminum deposited on PTE or copper clad FR-4. In some implementations, the ground plane 620 may comprise a conductive layer which is deposited on the substrate 624 at a side opposite a conductor. For example, the ground plane 620 may comprise aluminum, which has been deposited on a back side of the substrate 624 of the receive layer 618.

In other implementations, the sensor layers which make up the force sensor stack 120 may be different in construction, operation, or both. For example, the low range force sensor layer 606 may utilize electrical capacitance to determine an applied force, while the high range force sensor layer 610 uses electrical resistance to determine an applied force. In another example, the low range force sensor layer 606 may employ projected capacitance to detect an applied force while the medium range force sensor layer 608 may utilize an optical fiber Bragg grating to detect the applied force.

Figure 7:
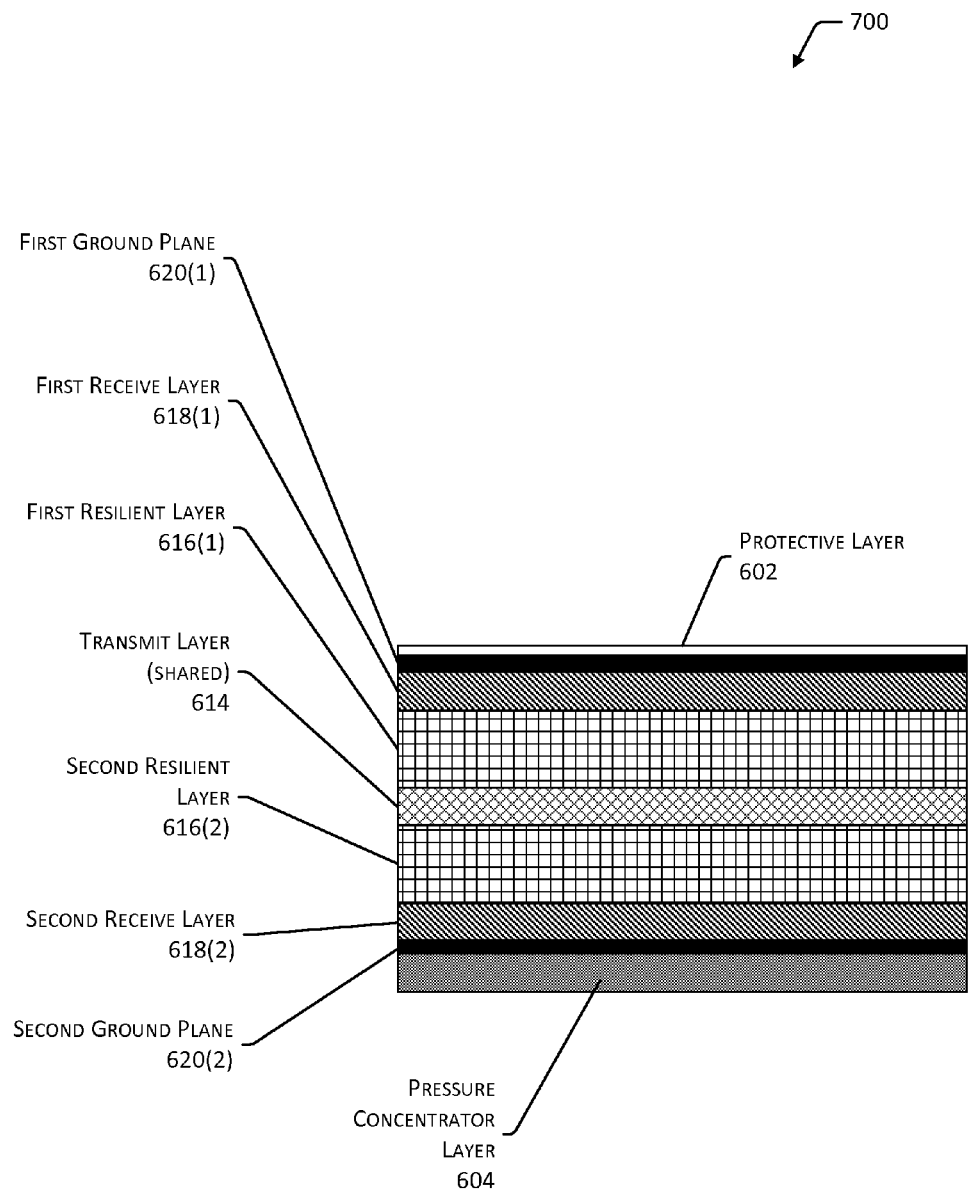
FIG. 7 is a side view of another implementation of a force sensor stack.

FIG. 7 is a side view 700 of another implementation of a force sensor stack 120. In this illustration, the force sensor stack 120 comprises two sensor layers, which share a common transmit layer 614. The protective layer 602 is atop the force sensor stack 120. Beneath the protective layer 602 is a first ground plane 620(1). Beneath the first ground plane 620(1) is a first receive layer 618(1). A first resilient layer 616(1) separates the first receive layer 618(1) and the transmit layer 614. Adjacent to the transmit layer 614, and on a side opposite the first resilient layer 616(1) is a second resilient layer 616(2). Adjacent layers may be arranged one atop another, one beneath another, and so forth. In some implementations, adjacent layers may abut one another, that is, be arranged side-by-side. Beneath the second resilient layer 616(2) is a second receive layer 618(2). Beneath the second receive layer 618(2) is a second ground plane 620(2). In some implementations, the central layer may comprise a shared receive layer 618, while the corresponding layers towards the respective top and bottom of the force sensor stack 120 may comprise transmit layers 614. The pressure concentrator layer 604 may be arranged at various locations within the force sensor stack 120 such as atop force sensors layers, between force sensor layers, or beneath force sensor layers. For example, as illustrated here the pressure concentrator layer 604 is beneath the second ground plane 620(2). An incident force applied to the protective layer 602 may thus exhibit a corresponding counter force from the pressure concentrator features of the pressure concentrator layer 604 elsewhere in the stack. In the configuration depicted here, the pressure concentrator layer 604 may omit relief features. For example, the pressure concentrator layer 604 on the bottom of the force sensor stack 120 may be relatively rigid, such as formed from a polycarbonate, as the pressure concentrator features are not displaced relative to one another.

Figure 8:
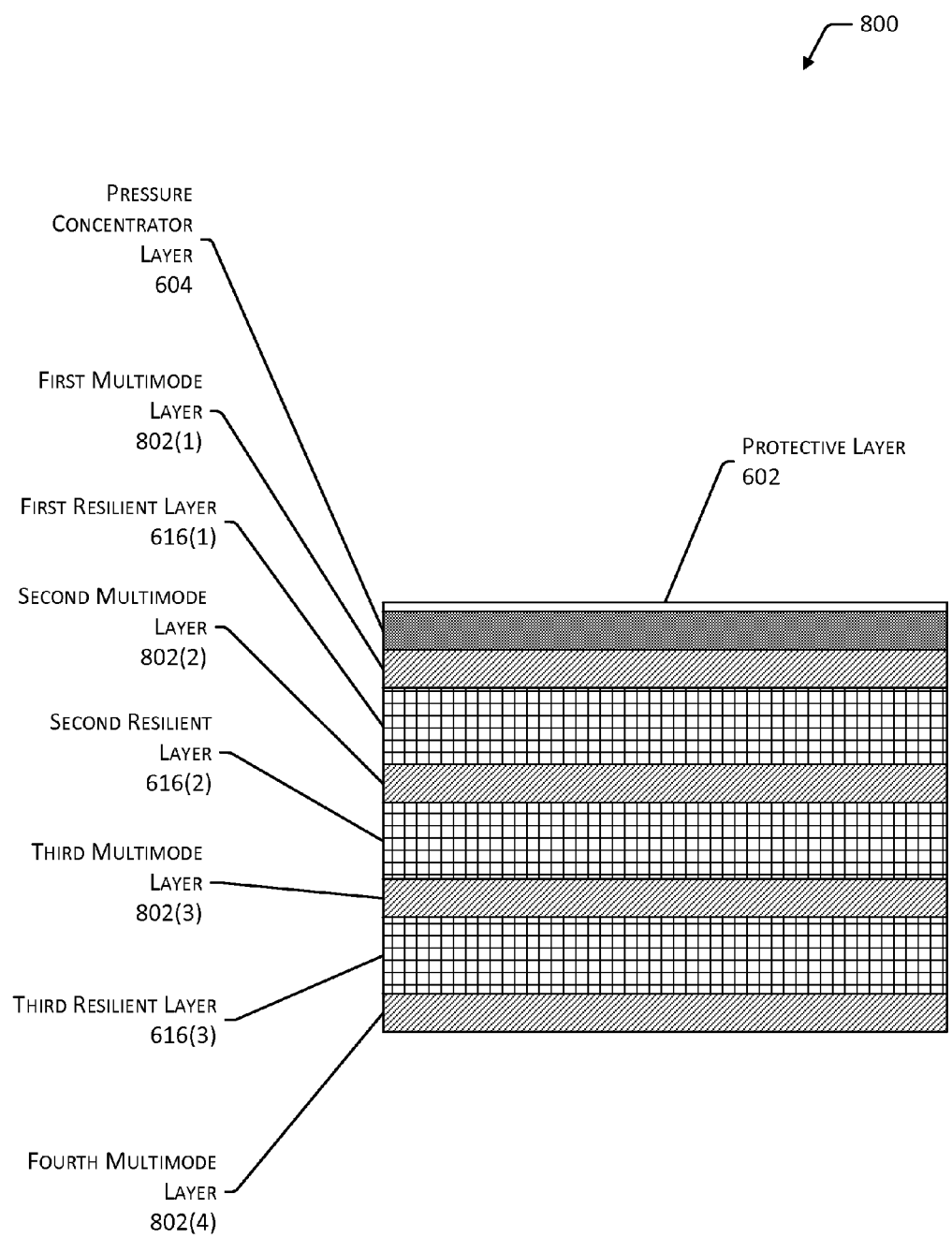
FIG. 8 is a side view of yet another implementation of a force sensor stack.

FIG. 8 is a side view 800 of yet another implementation of a force sensor stack 120. In this illustration, the force sensor stack 120 incorporates multimode layers which may operate as one or more of transmitter which emits an electrical signal, a receiver which receives the electrical signal, or an electrical ground. The multimode layers may include electrical conductors which may be selectively switched to a particular electrical circuit. Operation of the multimode layers may be controlled by one or more switches, such as transistors. The illustrated force sensor stack 120 includes three sensor layers.

The protective layer 602 is atop the force sensor stack 120. Beneath the protective layer is a pressure concentrator layer 604. Beneath the pressure concentrator layer 604 is the first multimode layer 802(1). A first resilient layer 616(1) is between the first multimode layer 802(1) from a second multimode layer 802(2). A second resilient layer 616(2) is between the second multimode layer 802(2) from a third multimode layer 802(3). A third resilient layer 616(3) is between the third multimode layer 802(3) and a fourth multimode layer 802(4). With this configuration, the individual multimode layers or the conductors therein may be transitioned between different operational modes where they may act as transmitter, receiver, or ground at different points in time, or simultaneously.

Figure 9:
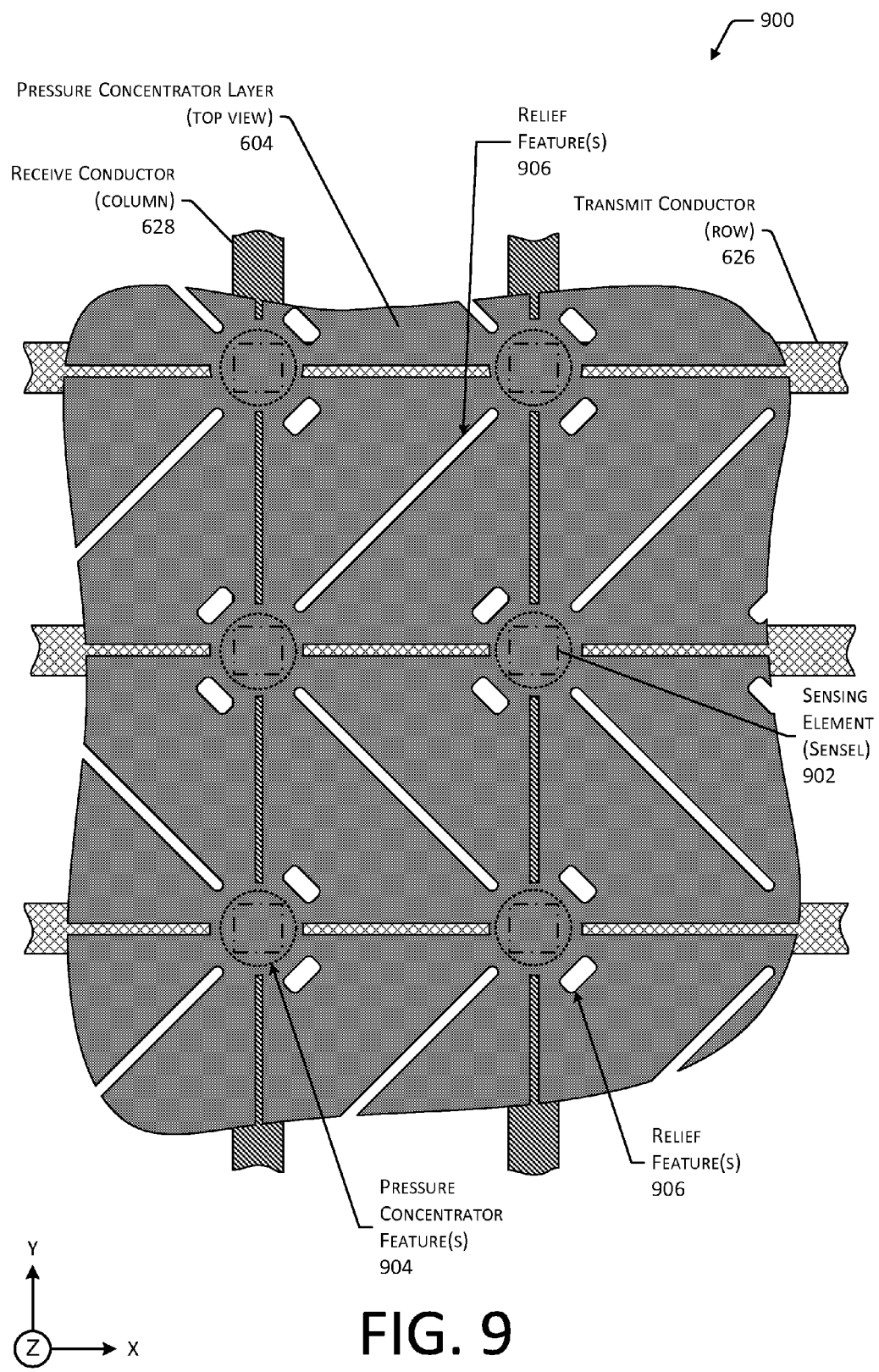
FIG. 9 is a top view of a pressure concentrator layer, according to some implementations.

FIG. 9 is a top view 900 of a pressure concentrator layer 604, according to some implementations. In this illustration, elements such as the protective layer 602 and the resilient layers 616 have been omitted for clarity and not by way of limitation.

As shown here, in some implementations, the transmit conductors 626 and the receive conductors 628 may form a two-dimensional rectilinear array of rows and columns. An intersection of a transmit conductor 626 and a receive conductor 628 forms a sensing element (sensel) 902. Applied force which results in deformation of the resilient layers 616 of the force sensor stack 120 may affect one or more characteristics, such as electrical capacitance or resistance at a sensel 902. These effects may be detected and used to determine information about the applied force. By scanning across a plurality of transmit conductors 626, and receive conductors 628, individual sensels 902 may be addressed and subsequently information may be acquired from the individual sensels 902. Furthermore, the scanning may be such that a control unit is able to determine when a particular transmit conductor 626 and receive conductor 628 are being addressed, providing position information within the two-dimensional array. In one implementation spacing in the X-Y plane between adjacent sensels 902 may about one centimeter, while the electrodes in the sensels 902 may be less than one millimeter in width.

The control unit may comprise one or more electronic circuits configured to measure one or more characteristics of the sensels 902. The control unit may be configured to determine a position and magnitude of an applied force at a plurality of sensels 902 for one or more of the force sensor layers of the force sensor stack 120.

The pressure concentrator layer 604 may include a plurality of pressure concentrator features 904. The pressure concentrator features 904 may be positioned along a common axis with the sensels 902. For example, as depicted here, the pressure concentrator features 904, which are circular in plain view are arranged over the sensels 902 of the underlying sensor layers of the force sensor stack 120. In other implementations, the pressure concentrator features 904 may be positioned between the sensels 902, or placed without regard for the position of the sensels 902. During operation, as force is applied to the pressure concentrator layer 604, that force is directed towards or communicated to the force sensor layers. The pressure concentrator feature 904 is configured to displace, upon application of the applied force, a portion of one or more of the force sensor layers which are proximate to the sensel 902. The proximity may include direct alignment such as where the pressure concentrator feature 904 is atop the sensel 902, or may include where the pressure concentrator feature 904 is between sensels 902 which are adjacent to one another. The pressure concentrator features 904 may be arranged in a regular periodic pattern (such as depicted here) or in an irregular aperiodic arrangement. For example, the pressure concentrator features 904 may be arranged in a random pattern. The pressure concentrator features 904 may be positioned atop the sensels 902, or may be offset therefrom. For example, the pressure concentrator features 904 may displace the portion of the force sensor layers between sensels 902.

By utilizing the pressure concentrator features 904, the force sensor stack 120 may provide improved signal data which may result in more accurate output, a decrease in noise in the output signal, improve distinction of edges of force distribution (such as an outline of the load on the force sensor stack 120), and so forth.

The pressure concentrator features 904 may be configured such that they have the same shape and cross-sectional area, or in some implementations, the pressure concentrator features 904 may vary from one another. In another example, a first set of pressure concentrator features 904 may have a first contact shape of a portion which touches the underlying sensor layer while a second set of pressure concentrator features 904 may have a second contact shape. For example, the shape of the pressure concentrator features 904, as depicted here are circular. The first set may be circular as shown while the second set comprises squares, triangles, polygons, or irregular shapes.

In another example, a first set of pressure concentrator features 904 may have a first contact area which touches the underlying sensor layer while a second set of pressure concentrator features 904 may have a second contact area with the underlying sensor layer, where the second contact area is greater than or less than the first contact area. Continuing the example, the first contact area for the pressure concentrator features 904 in the first set may be 0.25 mm$^2$ for each pressure concentrator feature 904 while the second contact area for the pressure concentrator features 904 in the second set may be 0.35 mm$^2$ for each pressure concentrator feature 904.

The pressure concentrator layer 604 may include one or more relief features 906. The relief features 906 may be configured to decouple or attenuate motion between adjacent pressure concentrator features 904. For example, the relief features 906 may decouple transverse motion in an X-Y plane of the pressure concentrator layer 604, as depicted here. The relief features 906 may comprise one or more of slots, holes, slits, pleats, troughs, folds, and so forth which are present in the pressure concentrator layer 604 or a portion thereof. A slot or hole comprises an area in which material has been removed. The slot or hole may be regular polygon, or have an irregular boundary. A slit comprises a cut through the material. A pleat, trough, or fold comprises features in which one or more bends are present in the material, and material has not been removed. In one implementation, in cross section a pleat may appear as "W", a trough as a "U", and a fold as an "L". The relief features 906 depicted here include slots and holes. The relief features 906 may be embossed onto, formed into, machined into, laminated onto, and so forth, the pressure concentrator layer 604. In other implementations, the pressure concentrator layer 604 may omit the relief features 906.

In one implementation, the pressure concentrator layer 604 may comprise a plurality of different materials with different physical characteristics. For example, the pressure concentrator layer 604 may comprise a contiguous layer of material which is flexible or elastomeric and upon which pressure concentrator features 904 are affixed or otherwise arranged. Continuing the example, the pressure concentrator layer 604 may comprise a PET film with polycarbonate pressure concentrator features 904 affixed thereto.

Figure 10:
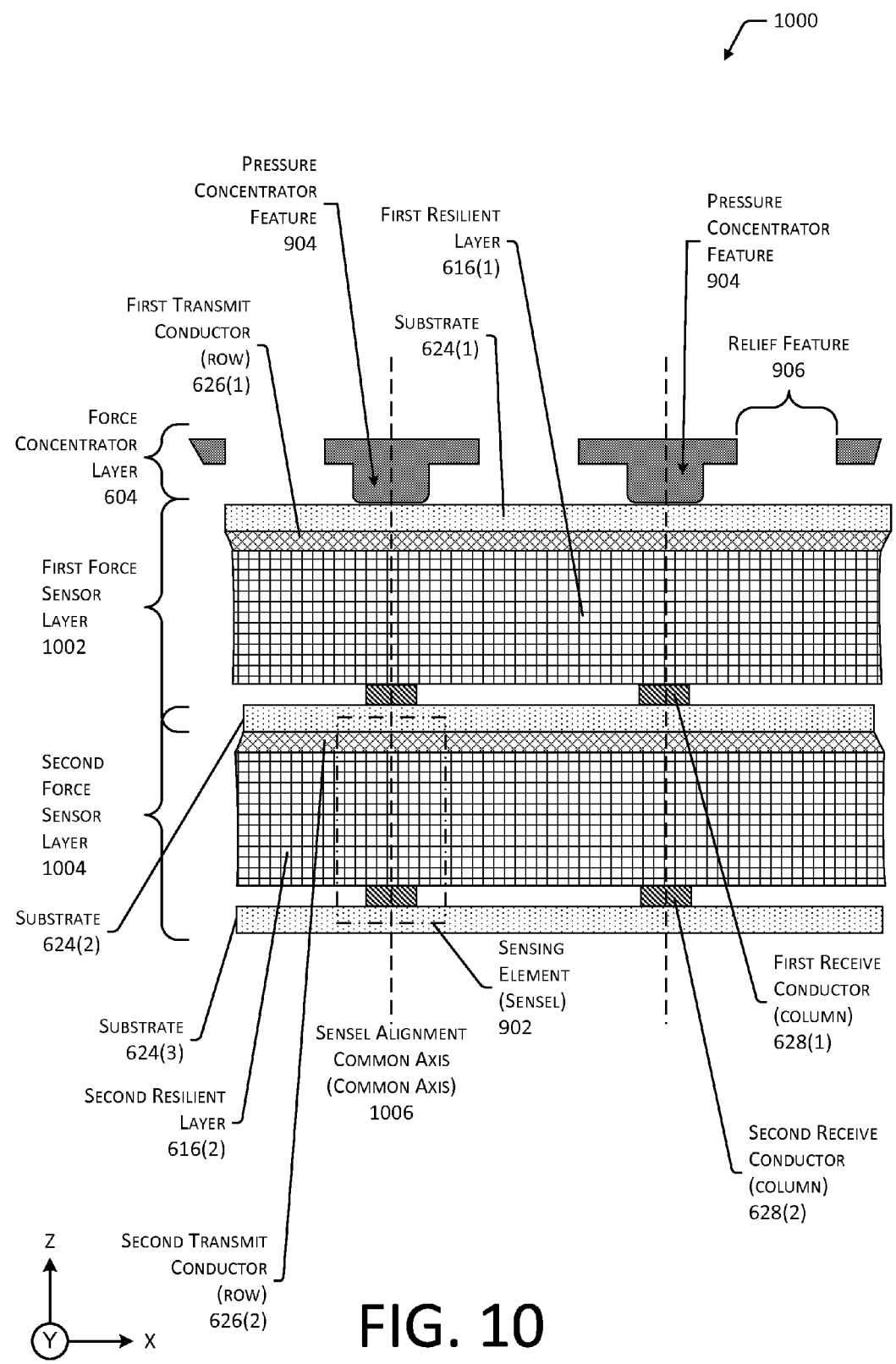
FIG. 10 is a side view of the pressure concentrator layer of FIG. 9, according to some implementations.

FIG. 10 is a side view 1000 of the pressure concentrator layer of FIG. 9, according to some implementations. Beneath the pressure concentrator layer 604 is a first force sensor layer 1002, and beneath that a second force sensor layer 1004. In this illustration, a two sensor layer force sensor stack 120 is depicted with a shared substrate 624(2). As described above, each of the different force sensor layers may be responsive to a different range of applied forces, and may also comprise a plurality of sensels 902.

Depicted along the broken line are sensel alignment common axes 1006. The pressure concentrator features 904 may be aligned with the sensels 902 of one or more of the sensor layers. As depicted here, the pressure concentrator feature 904 and the sensels 902 of the first force sensor layer 1002 and the second force sensor layer 1004 are aligned along a sensel alignment common axis (common axis) 1006.

Upon application of an applied force, such as a load sitting on the force sensor stack 120, the pressure concentrator feature 904 redistributes the applied force along the common axis 1006. As a result, the displacement of the resilient layers 616 in the sensor layers are facilitated.

Also depicted in a side view are relief features 906. As a result of the relief features 906, force on one pressure concentrator feature 904 may not necessarily be transferred to adjacent pressure concentrator features 904. As a result, quality of the data output from the force sensor stack 120 may be improved.

Figure 11:
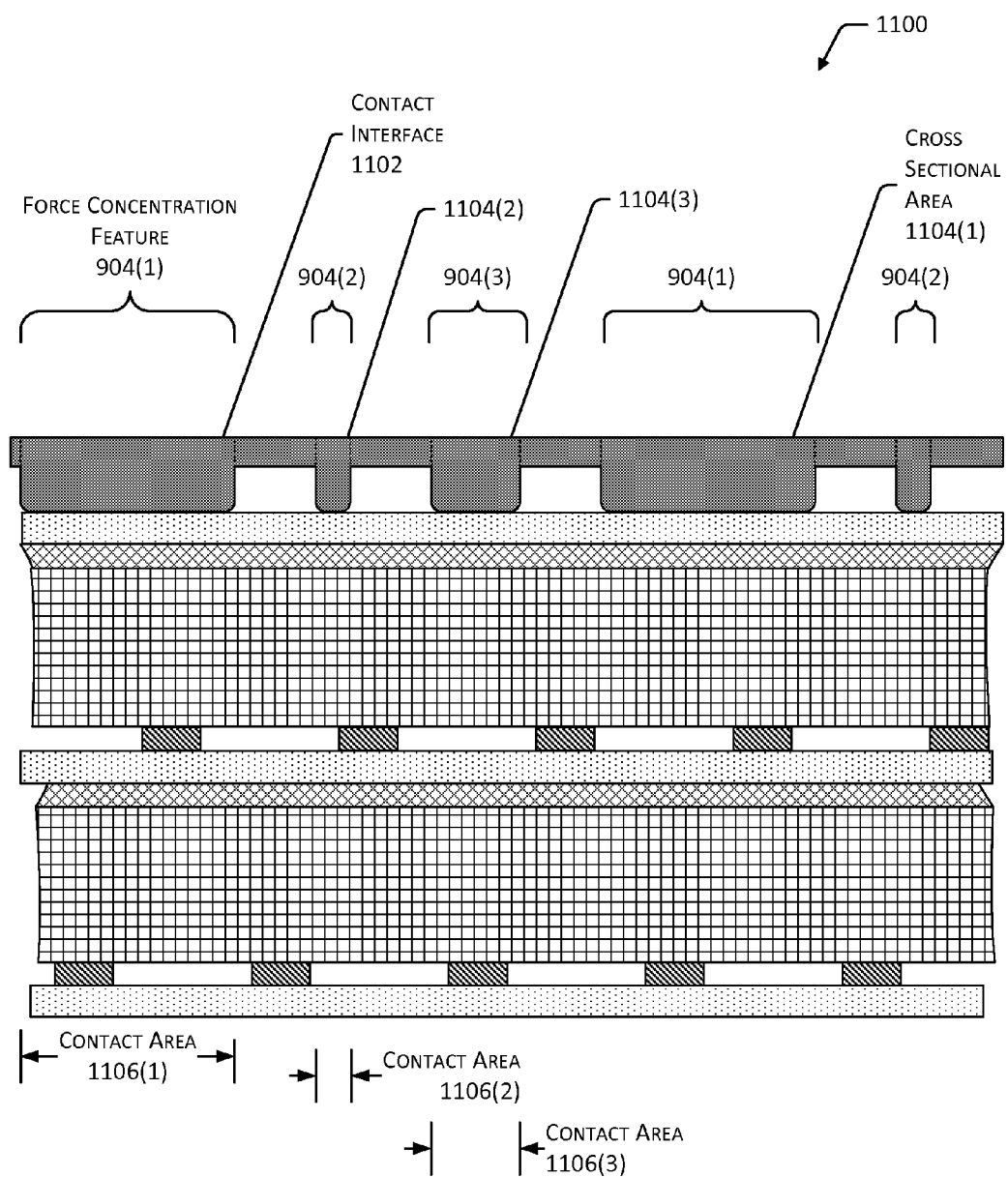
FIG. 11 is a side view of another implementation of the pressure concentrator layer having pressure concentrator features with different cross sectional areas, according to some implementations.

FIG. 11 is a side view 1100 of another implementation of the pressure concentrator layer 604, according to some implementations. In this implementation, the pressure concentrator features 904 have different cross sectional areas and are not placed along a common axis 1006.

Contact interface 1102 is illustrated at the point where a pressure concentrator feature 904 touches an adjacent portion of a sensor layer. For example, in this illustration, the contact interface 1102 comprises the portion of the pressure concentrator layer 604 which is in contact with the substrate 624 of the first force sensor layer 1002. Each pressure concentrator feature 904 exhibits a cross-sectional area

1104. For example, the cross-sectional area 1104 for each of the pressure concentrator features 904 depicted in this illustration is bounded by a dotted line.

This illustration depicts three different sets of pressure concentrator features 904(1), 904(2), and 904(3), each with a correspondingly different cross-sectional area 1104(1), 1104(2), 1104(3). For example, the cross-sectional area 1104 may be expressed as an area of the X-Z plane of this illustration. By providing pressure concentrator features 904 with different cross-sectional areas 1104, the force sensor stack 120 may exhibit different sensitivity to different applied forces. For example, smaller cross-sectional areas of such as the cross-sectional area 1104(2) may provide improved responsiveness for low applied forces, as compared to larger cross-sectional areas such as 1104(1).

The cross-sectional area 1104 may also change resiliency of the pressure concentrator layer 604 locally with respect to the pressure concentrator feature 904. For example, the cross-sectional area 1104 depicted in this illustration is predominantly rectangular and thus may provide a relatively rigid structure. In comparison, a smaller cross-sectional area 1104 may be accomplished by an inverted T configuration. In such a situation, a contact area 1106 may remain constant, while the cross-sectional area 1104 is decreased.

The contact area 1106 comprises the area at the contact interface 1102. For example, the contact area 1106 may comprise the area as exhibited within the X-Y plane of this illustration. As illustrated here, contact areas 1106(1)-(3) for the different pressure concentrator features 904(1)-(3) differ from one another. For example, the contact area 1106(1) is greater than the contact area 1106(2).

In some implementations, such as depicted here, the sensels 902 of different sensor layers may not necessarily be aligned with one another, and likewise the pressure concentrator features 904 may not necessarily align with the sensels 902. For example, the pressure concentrator features 904 may be positioned between sensels 902 rather than atop them as described in FIG. 9.

Illustrative Processes

Figure 12:
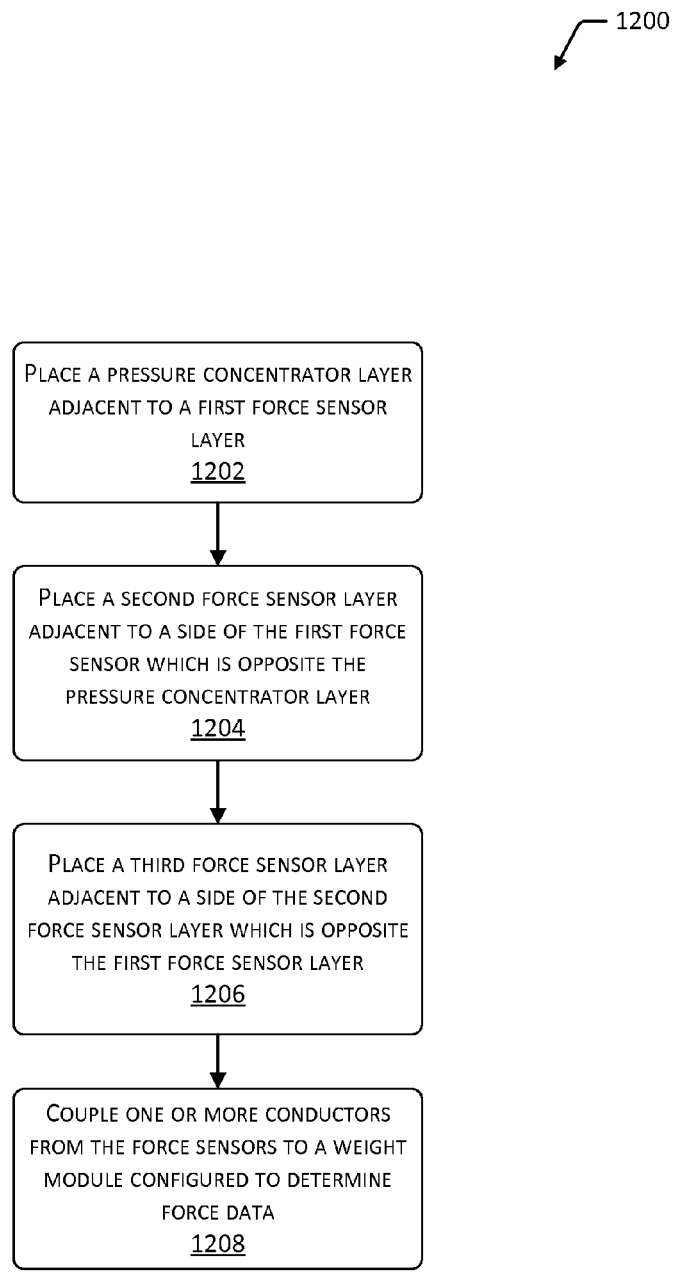
FIG. 12 is a flow diagram of a process of assembling a force sensor stack, according to some implementations.

FIG. 12 depicts a flow diagram 1200 of assembling the force sensor stack 120, according to some implementations. This process may be performed manually, by way of an automated process, such as a robot, or both.

Block 1202 places a pressure concentrator layer 604 adjacent to a first force sensor layer. For example, the pressure concentrator layer 604 may be placed atop or beneath the low range force sensor layer 606.

Block 1204 places a second force sensor layer adjacent to a side of the first force sensor layer which is opposite the pressure concentrator layer 604. For example, the medium range force sensor layer 608 may be placed beneath the low range force sensor layer 606.

Block 1206 places a third force sensor layer adjacent to a side of the second force sensor layer which is opposite the first force sensor layer. For example, the high range force sensor layer 610 may be placed beneath the medium range force sensor layer 608. In some implementations, the pressure concentrator features 904 and the sensels 902 in the different force sensor layers 606-610 may be aligned along the common axis 1006, or may be placed without regard to alignment with one another.

Block 1208 couples one or more conductors from the force sensor layers to a weight module configured to determine force data 124. For example, flexible printed circuits may be used to couple the one or more conductors to the weight module 318, or another controller device.

In some implementations, layers of the force sensor stack 120 may be joined together by way of an adhesive, lamination, external packaging, electrostatic force, and so forth. For example, the force sensor layers 606, 608, and 610 may be coated with a heat activated adhesive.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A force measuring apparatus comprising:
a first force sensor layer comprising a first plurality of capacitive sensing elements configured to detect applied forces having a range between a first force and a second force;
a second force sensor layer comprising:
a second plurality of capacitive sensing elements configured to detect applied forces having a range between a third force and a fourth force, wherein the third force is less than the first force and the fourth force is less than the second force; and
wherein the second force sensor layer is atop the first force sensor layer;
a pressure concentrator layer comprising:
a plurality of pressure concentrator features configured to distribute an incident force to an area proximate to the first plurality of capacitive sensing elements and the second plurality of capacitive sensing elements;
a plurality of relief features; and
wherein the pressure concentrator layer is atop the second force sensor layer on a side opposite the first force sensor layer; and
a protective layer atop the pressure concentrator layer on a side of the pressure concentrator layer opposite the second force sensor layer.

2. The force measuring apparatus of claim 1, wherein:
the first force sensor layer comprises a first resilient urethane foam material; and
the second force sensor layer comprises a second resilient urethane foam material, wherein the first resilient urethane foam material is stiffer than the second resilient urethane foam material.

3. The force measuring apparatus of claim 1, wherein the plurality of relief features are configured to decouple transverse motion in a plane of the pressure concentrator layer between adjacent pressure concentrator features, and further wherein the plurality of relief features comprises one or more of:
holes in the pressure concentrator layer,
slits in the pressure concentrator layer, or
pleats in the pressure concentrator layer.

4. The force measuring apparatus of claim 1, wherein the plurality of pressure concentrator features comprises:
a first set of pressure concentrator features having a first contact area comprising an area at which a pressure concentrator feature of the first set of pressure concentrator features touches the second force sensor layer; and
a second set of pressure concentrator features having a second contact area comprising an area at which a pressure concentrator feature of the second set of pressure concentrator features touches the second force sensor layer, wherein the second contact area is greater than the first contact area.

5. A device comprising:
a first force sensor responsive to a first range of applied force;
a second force sensor adjacent to the first force sensor, wherein the second force sensor is responsive to a second range of applied force; and
a pressure concentrator comprising a plurality of pressure concentrator features, wherein:
at least a portion of each of the plurality of pressure concentrator features are configured to distribute an applied force produced by an object in contact with the device to sensing elements in both the first force sensor and the second force sensor; and
the plurality of pressure concentrator features comprises:
a first set of pressure concentrator features, each pressure concentrator feature of the first set of pressure concentrator features having a first contact area in contact with one or more of the first force sensor or the second force sensor; and
a second set of pressure concentrator features, each pressure concentrator feature of the second set of pressure concentrator features having a second contact area in contact with the one or more of the first force sensor or the second force sensor.

6. The device of claim 5, wherein at least a portion of the first range of applied force is exclusive of at least a portion of the second range of applied force.

7. The device of claim 5, wherein the pressure concentrator is arranged between an exterior of the device and either the first force sensor or the second force sensor, and further wherein the object is in contact with the exterior of the device.

8. The device of claim 5, wherein the pressure concentrator is adjacent to the first force sensor, the second force sensor, or both.

9. The device of claim 5, wherein the first force sensor and the second force sensor share one or more of a transmit layer comprising a first plurality of electrical conductors configured to emit an electrical signal, a receive layer comprising a second plurality of electrical conductors configured to receive the electrical signal, or a multimode layer comprising a third plurality of electrical conductors configured to emit or receive the electrical signal.

10. The device of claim 5, further comprising:
a third force sensor adjacent to the second force sensor, wherein the third force sensor is responsive to a third range of applied force; and
wherein the third range of applied force is greater than the second range of applied force, and further wherein the second range of applied force is greater than the first range of applied force.

11. The device of claim 5, wherein:
the first contact area is greater than the second contact area.

12. The device of claim 5, wherein:
the each pressure concentrator feature of the first set of pressure concentrator features having a first contact shape;
the each pressure concentrator feature of the second set of pressure concentrator features having a second contact shape; and
the first contact shape is different from the second contact shape.

13. The device of claim 5, wherein the pressure concentrator comprises a relief feature, the relief feature comprising one or more of:
a hole in the pressure concentrator,
a slit in the pressure concentrator, or
a pleat in the pressure concentrator.

14. The device of claim 5, wherein the first force sensor, the second force sensor, or both comprise a plurality of sensing elements arranged in a regular pattern, and wherein the plurality of sensing elements comprise one or more of a capacitive force sensor or a resistive force sensor.

15. The device of claim 5, wherein the first force sensor, the second force sensor, or both comprise a capacitive force sensor or a resistive force sensor, and further wherein:

the capacitive force sensor comprises:
  a first transmit electrode comprising a first electrical conductor configured to emit a first electrical charge;
  a first electrical insulator;
  a first receive electrode comprising a second electrical conductor configured to receive the first electrical charge, wherein the first receive electrode and the first transmit electrode are separated by the first electrical insulator; and
  a capacitive detector configured to determine electrical capacitance between the first transmit electrode and the first receive electrode; and
the resistive force sensor comprises:
  a second transmit electrode comprising a third electrical conductor configured to emit a second electrical charge;
  a second electrical insulator configured to vary in electrical resistivity upon compression;
  a second receive electrode comprising a fourth electrical conductor configured to receive the second electrical charge, wherein the second receive electrode and the second transmit electrode are separated by the second electrical insulator; and
  an electrical resistance detector configured to determine electrical resistance between the second transmit electrode and the second receive electrode.

16. The device of claim 5, wherein the pressure concentrator comprises a flexible material to which the plurality of pressure concentrator features are affixed.

17. The device of claim 5, further comprising:
a control unit configured to determine a plurality of positions and magnitudes of the applied force as distributed by the plurality of pressure concentrator features to a plurality of sensing elements of one or more of the first force sensor or the second force sensor.

18. A device comprising:
a plurality of force sensors, wherein each force sensor comprises a plurality of sensing elements responsive to different ranges of applied force; and
a pressure concentrator comprising a plurality of pressure concentrator features, wherein:
  the plurality of pressure concentrator features are configured to displace, upon application of an applied force, a portion of one of the plurality of force sensors proximate to one or more of the plurality of sensing elements therein; and
  the plurality of pressure concentrator features comprising:
    a first set of pressure concentrator features, each pressure concentrator feature of the first set of pressure concentrator features having a first cross sectional area; and
    a second set of pressure concentrator features, each pressure concentrator feature of the second set of pressure concentrator features having a second cross sectional area.

19. The device of claim 18, wherein the pressure concentrator further comprises a plurality of features configured to attenuate motion between adjacent pressure concentrator features resulting from application of the applied force.

20. The device of claim 18, wherein:
the first cross sectional area is greater than the second cross sectional area.

21. The device of claim 18, wherein the each force sensor comprises one or more of a capacitive force sensor or a resistive force sensor, and further wherein:
the capacitive force sensor comprises:
  a first transmit electrode comprising a first electrical conductor configured to emit a first electrical charge;
  a first electrical insulator;
  a first receive electrode comprising a second electrical conductor configured to receive the first electrical charge, wherein the first receive electrode and the first transmit electrode are separated by the first electrical insulator; and
  a capacitive detector configured to determine electrical capacitance between the first transmit electrode and the first receive electrode; and
the resistive force sensor comprises:
  a second transmit electrode comprising a third electrical conductor configured to emit a second electrical charge;
  a second electrical insulator configured to vary in electrical resistivity upon compression;
  a second receive electrode comprising a fourth electrical conductor configured to receive the second electrical charge, wherein the second receive electrode and the second transmit electrode are separated by the second electrical insulator; and
  an electrical resistance detector configured to determine electrical resistance between the second transmit electrode and the second receive electrode.

* * * * *